Figure 10:
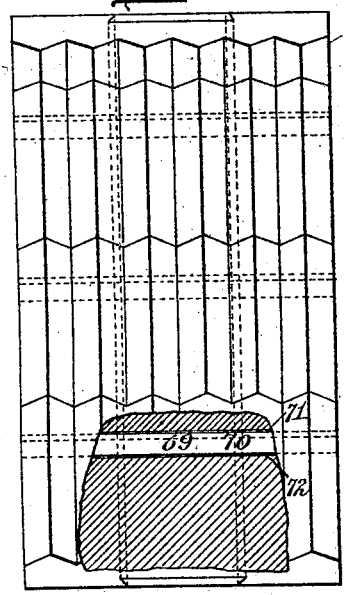

W. S. McKEE & F. E. JOHNSON.
CRUSHER JAW PLATE.
APPLICATION FILED JAN. 25, 1915.
1,187,159.
Patented June 13, 1916.
5 SHEETS—SHEET 1.
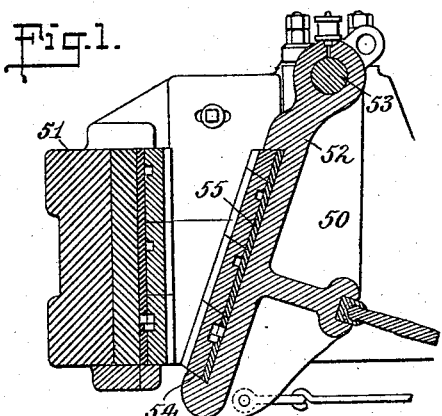
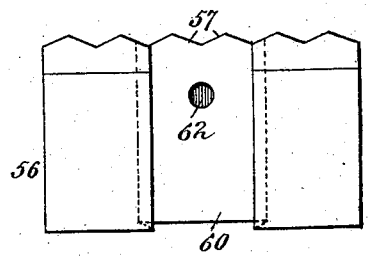
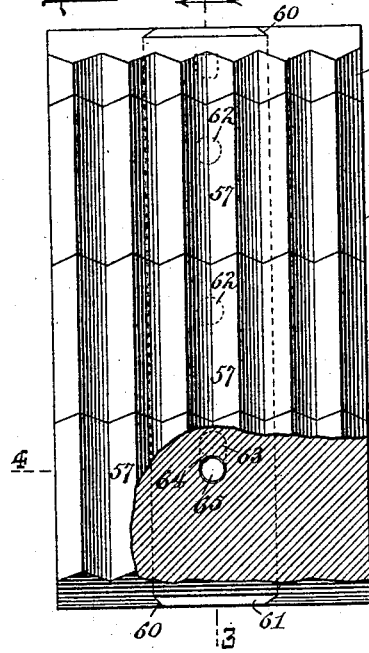
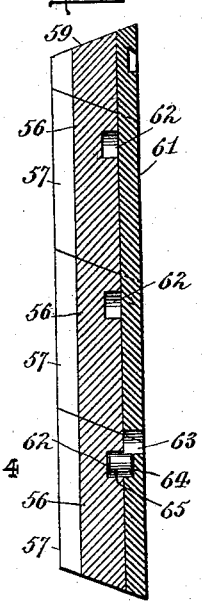
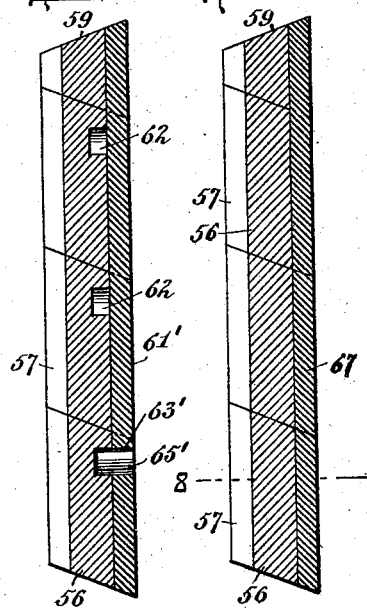
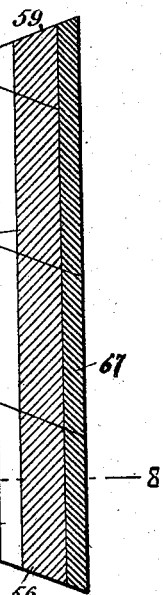
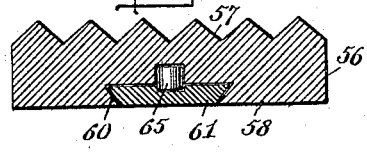
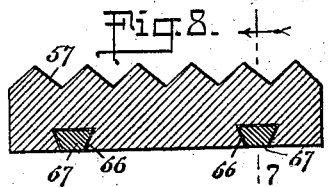
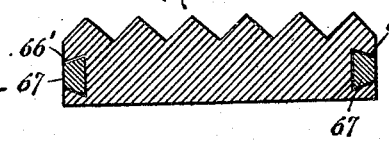
WITNESSES
INVENTOR
Walter S. McKee.
Frank E. Johnson.
BY George Cook
ATTORNEY W. S. McKEE & F. E. JOHNSON.
CRUSHER JAW PLATE.
APPLICATION FILED JAN. 25, 1915.

1,187,159.

Patented June 13, 1916.
5 SHEETS—SHEET 2.

WITNESSES
John Cook
George E. Cook

INVENTOR
Walter S. McKee.
Frank E. Johnson
BY George Cook
ATTORNEY

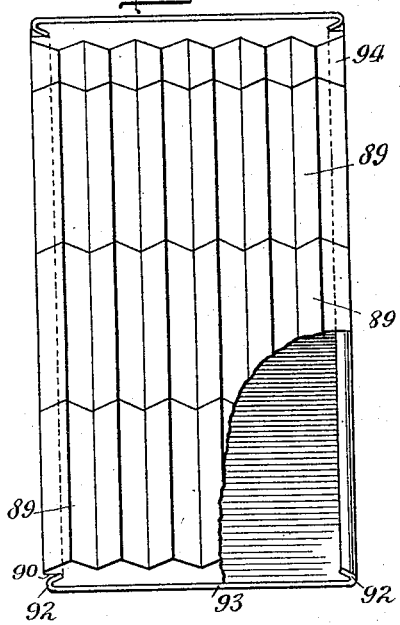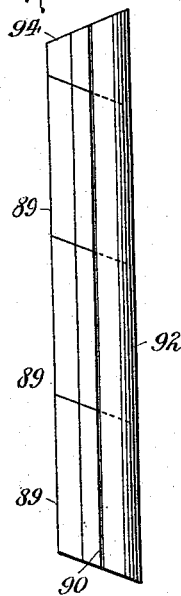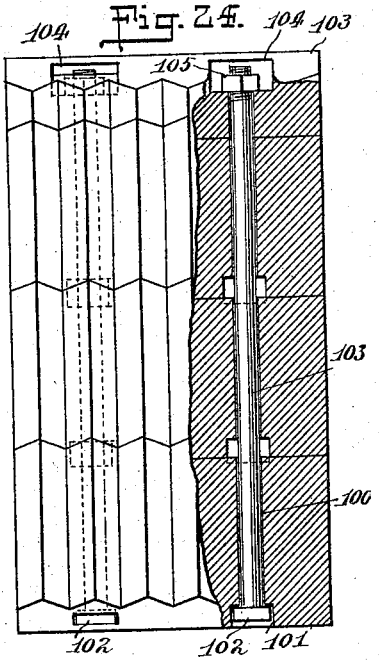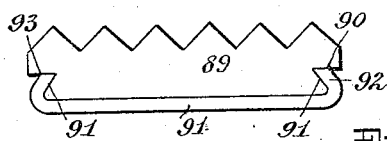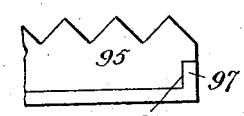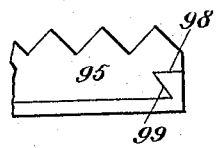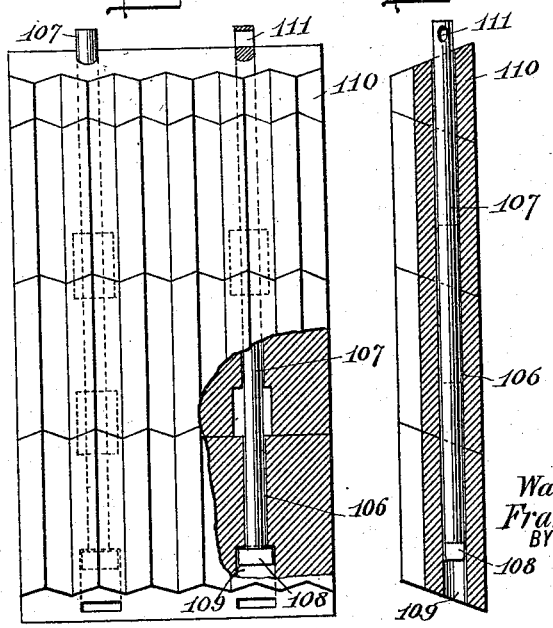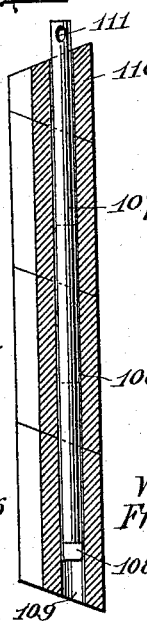

W. S. McKEE & F. E. JOHNSON.
CRUSHER JAW PLATE.
APPLICATION FILED JAN. 25, 1915.

1,187,159.

Patented June 13, 1916.
5 SHEETS—SHEET 4.

WITNESSES
John Cook
George E. Cook

INVENTOR
Walter S. McKee.
Frank E. Johnson.
BY George Cook
ATTORNEY

W. S. McKEE & F. E. JOHNSON.
CRUSHER JAW PLATE.
APPLICATION FILED JAN. 25, 1915.

1,187,159.

Patented June 13, 1916.
5 SHEETS—SHEET 5.

Inventors:
Walter S. McKee
Frank E. Johnson
By George Cook & Sons, Attys.

UNITED STATES PATENT OFFICE.

WALTER S. McKEE, OF CHICAGO, ILLINOIS, AND FRANK E. JOHNSON, OF SALT LAKE CITY, UTAH, ASSIGNORS TO AMERICAN MANGANESE STEEL COMPANY, OF AUGUSTA, MAINE, A CORPORATION OF MAINE.

CRUSHER JAW-PLATE.

1,187,159.  Specification of Letters Patent.  Patented June 13, 1916.

Application filed January 25, 1915. Serial No. 4,088.

*To all whom it may concern:*

Be it known that we, WALTER S. McKEE, a citizen of the United States, and a resident of Chicago, in the county of Cook and State of Illinois, and FRANK E. JOHNSON, a citizen of the United States, and a resident of Salt Lake City, in the county of Salt Lake and State of Utah, have made and invented certain new and useful Improvements in Crusher Jaw-Plates, of which the following is a specification.

This invention relates to jaw plates and more particularly to those which are used in crushers and analogous machines.

The greatest wear upon the plates, of both the stationary and swinging jaws of a crusher, occurs at the lower extremities thereof, due principally to the fact, that the jaws are spaced at a minimum distance apart at these points. The unequal wearing of the jaw plates of crushers has been a constant source of annoyance and expense, oftentimes causing the premature discarding of the entire jaw plates.

Among the objects of our invention is the provision of a jaw plate made up of a plurality of sections, suitable means being provided whereby the said sections may be locked together so as to form a unitary structure, and at the same time, so arranged that as the lowermost section becomes worn and useless, it may be detached from the remaining sections and discarded, each of the sections being moved downward and a new section inserted at the top thereof. A uniform wearing of the plate section will thus be had, preserving the continuity of the front or wearing face of the plate.

A further object is to provide novel and advantageous means for holding and locking the several sections of a jaw plate together, due provision being made whereby the sections may be readily detached, providing for their convenient renewal.

A further object is to provide a jaw plate composed of a plurality of sections, so arranged and constructed that they may be conveniently locked in assembled relation, and with the locking means so devised that the strains and stresses brought to bear upon the several sections of the jaw plate during the crushing of ore or rock are not transmitted to the said locking means nor is it subject to wear or exposed to injury.

Other objects will appear as the description proceeds, it being understood that changes in the precise embodiment of the invention, as herein disclosed, can be made within the scope of what is claimed without departing from the spirit of the invention.

The preferable forms of our invention are disclosed in the accompanying drawings, wherein:—

Figure 11:
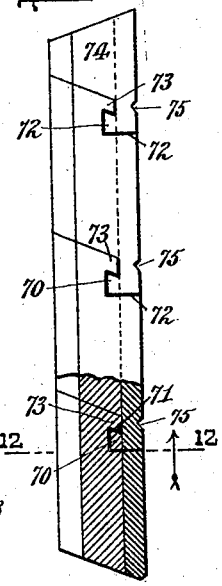
Figure 15:
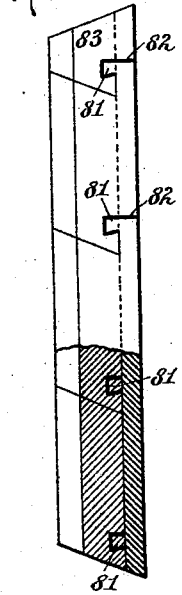
Figure 16:
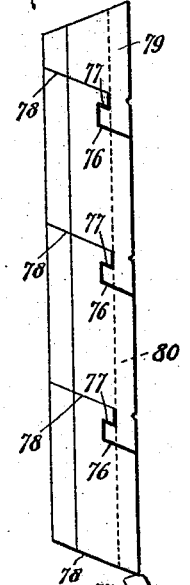
Figure 12:
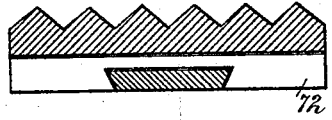
Figure 13:
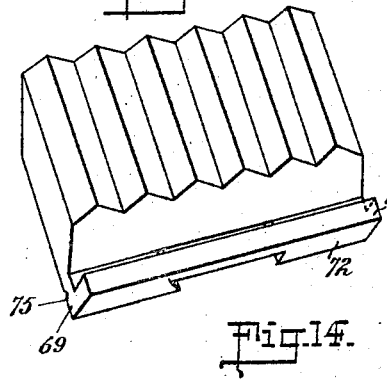
Figure 14:
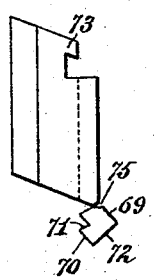
Figure 17:
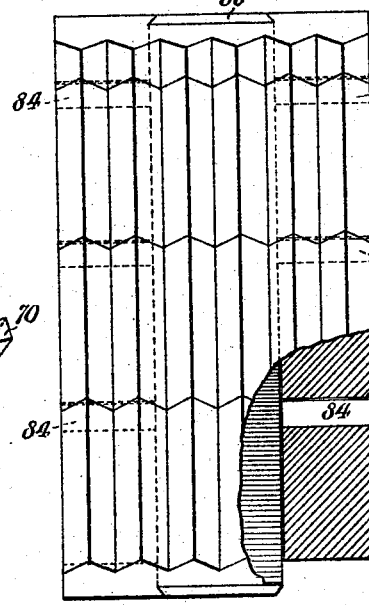
Figure 18:
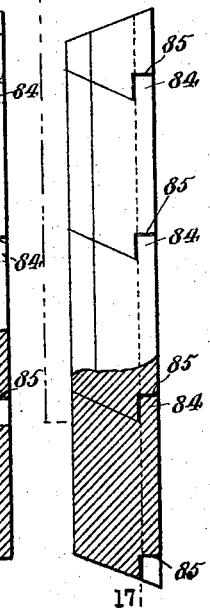
Figure 27:
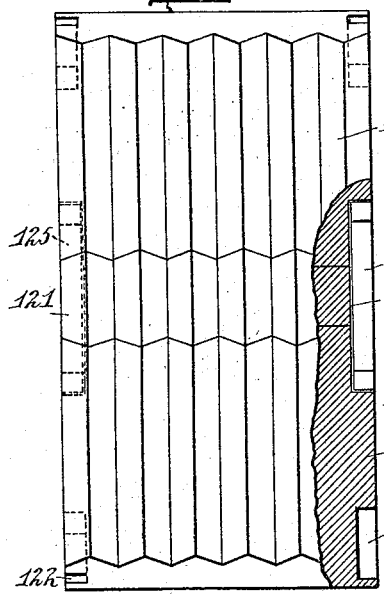
Figure 28:
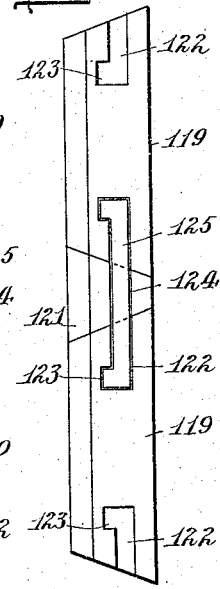
Figure 29:
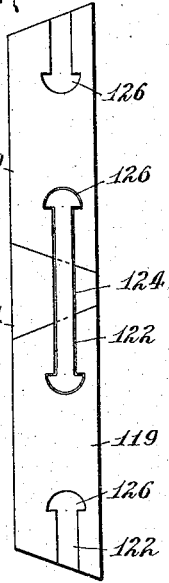
Figure 30:
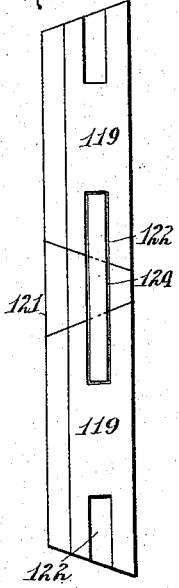
Figure 31:
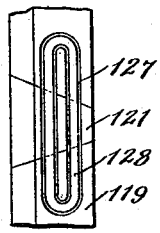
Figure 32:
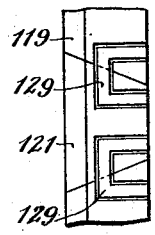
Figure 33:
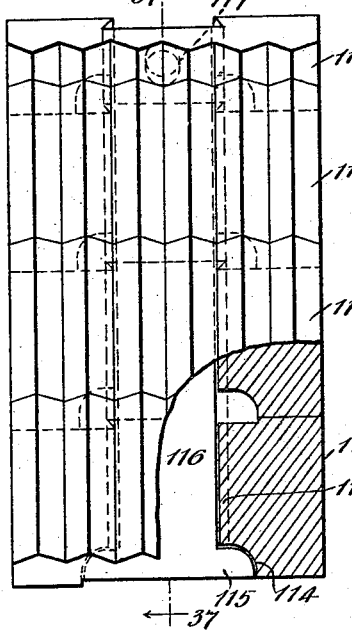
Figure 34:
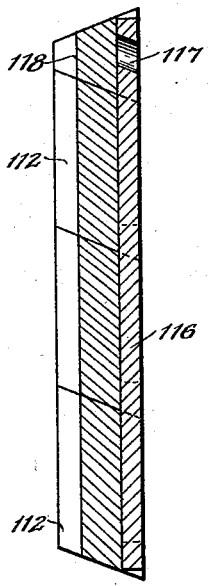
Figure 35:
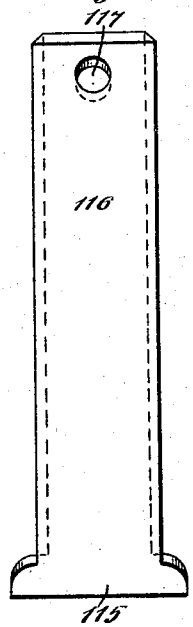
Figure 36:
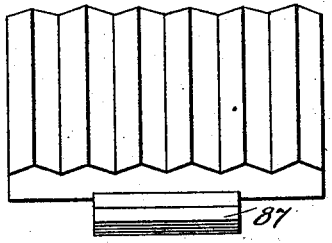
Figure 37:

Figure 1 is a view, partially in section, illustrating a portion of a crusher equipped with our novel jaw plates. Fig. 2 is a top plan view of our novel sectional jaw plate, portions thereof being broken away to more fully disclose certain structural details thereof. Figs. 3 and 4 are sectional views taken on the lines 3—3 and 4—4 respectively of Fig. 2. Fig. 5 is a fragmental view illustrating in plan the back of the crusher jaw plate of Fig. 2. Fig. 6 is a view in section similar to that shown in Fig. 3 illustrating a slightly modified form of locking key. Fig. 7 is a view in longitudinal section of a somewhat modified form of jaw plate, the modification residing in the number and disposal of the locking keys. Fig. 8 is a cross-sectional view taken on the line 8—8 of Fig. 7. Fig. 9 is a view similar to that disclosed in Fig. 8 wherein the locking keys are disposed upon opposite side edges of the jaw sections, rather than along the bottom face thereof, as disclosed in Figs. 7 and 8. Fig. 10 is a top plan view of a jaw plate, portions thereof being broken away, wherein the jaw sections are provided with projecting lips, and corresponding grooves or depressions which aid and abet the locking keys in holding the several sections in their assembled relation. Fig. 11 is a view in side elevation, with portions thereof broken away, of this latter mentioned type of jaw plate. Fig. 12 is a view in section taken on the line 12—12 of Fig. 11. Fig. 13 is a view in perspective of one of the ends of a jaw section of the type just described. Fig. 14 illustrates the manner in which a projecting lip is broken from a section prior to it assuming the lowermost position. Fig. 15 is a view, partially in side elevation and partially in section, of a jaw plate embodying a somewhat different form of engagement between the several sections, the lips being disposed at the uppermost extremity of each of the sections rather than at the lower extremities as disclosed in Figs. 10 to 14 inclusive. Fig. 16 illustrates a somewhat modified form of lip construction, the arrangement being such that the various sections may be assembled, one by one in the recess in the stationary or swinging jaw and subsequently keyed together. Figs. 17 and 18 illustrate, in top plan and side elevation, a somewhat modified form of lip with which the various sections are provided. Figs. 19 and 20 illustrate in top plan and side elevation a crusher jaw plate composed of a plurality of independent sections, rigidly locked together and held against lateral movement by a back bracing plate. Figs. 21, 22 and 23 represent in end elevation various forms of engagement between the reinforcing back plate and the jaw plate sections. Fig. 24 illustrates a jaw plate wherein the various sections are rigidly held together by means of longitudinal rods which extend through suitable openings therein. Figs. 25 and 26 represent in front and side section a somewhat modified form of locking rod for securing the various sections together. Figs. 27, 28, 29 and 30 represent in front and side elevation a jaw plate composed of upper, lower and intermediate sections wherein the intermediate section is in the form of a wedge block, the various sections being held together by means of suitable side keys; the various views illustrating several different forms of these keys. Figs. 31 and 32 fragmentally illustrate further forms of holding keys of the type illustrated in Figs. 27 to 30 inclusive. Fig. 33 is a view in top plan, with portions thereof broken away, illustrating a section of jaw plate with a centrally disposed longitudinally extending locking key, the same being provided with a head at its lower extremity and the various sections equipped with suitable recesses adapted to accommodate the key head therein. Fig. 34 is a view in longitudinal section taken on the line 37—37 of Fig. 33. Fig. 35 is a view in plan of the locking key utilized in the form of a jaw plate illustrated in Figs. 33 and 34. Fig. 36 is a fragmental view of the lower extremity of a section in which the projecting lip is disposed at the center of the lower extremity of a section. Fig. 37 is a view in side elevation of the just-mentioned type.

Referring to the several views wherein similar reference numerals designate corresponding parts throughout, a crusher as illustrated in Fig. 1, usually includes a frame 50, upon which is mounted a stationary jaw 51 and a swinging or movable jaw 52. The swinging jaw is supported upon a shaft or trunnion 53, allowing it to oscillate toward and away from the stationary jaw, it being noted that it always extends at an angle thereto, the angle being such that the jaws are spaced apart a minimum distance at their lower extremities, which define the discharge outlet from between the crusher jaws.

The various jaw plate sections disclosed in the several views are provided with beveled ends, the same corresponding to the lower beveled wall, 54, of the swinging jaw recess 55, the latter being provided for the reception of the jaw plate sections. However, it is to be noted, that the various jaw plate sections may be provided with straight edges similar to those shown as forming the stationary jaw disclosed in Fig. 1. The angularity between the stationary and swinging jaws, and the minimum spacing between the jaws occurring at their lower extremities, causes the greatest amount of wear upon the jaw plates to occur at their lower and discharging extremities, the various portions of the jaw plates disposed thereabove being subjected to wear according to their relative position thereabove. In order, therefore, that excessive wear at the lower extremity of a jaw plate will not necessitate its entire removal and discarding, we have provided a jaw plate, such as illustrated in Fig. 2, made up of a plurality of sections, 56, each section including or formed with the front, wearing or crushing face 57 and back 58. The upper and lower edges of each section are beveled upwardly from the back toward the front wearing face 57, as clearly disclosed in Fig. 3. Each jaw plate is formed of a plurality of these sections to which is added a top wedge block 59, the same being similar to the sections 56, but has its upper and lower edges oppositely beveled to form a wedge.

The various sections are locked together to form a unitary jaw plate by providing each section with an undercut or dovetail slot 60 extending along its back and in which is driven a locking key 61. In order to prevent the relative motion and therefore detachment of the various sections and the locking key, each section is provided with a recess 62, one of which coöperates with an opening 63 in the locking key, with which it is adapted to register. The opening 63 in the locking key communicates with a recess 64, so that a slug 65 may be inserted through the opening 63 in the key, and seated within the recess 62 in one of the jaw plate sections. The slug is of such size that it extends beyond the jaw plate section recess and is adapted to enter, or partially enter the recess 64 in the locking key as the latter is driven into its final position, such as illustrated in Fig. 3.

A somewhat modified form of locking key is disclosed in Fig. 6 wherein it will be observed that the locking key 61' is provided with a single aperture 63' which is adapted to receive a pin 65', the same wedgedly engaging the sides of the aperture 63' and extending into the recess formed in the lowermost section of the jaw plate. With the pin so positioned it performs the same functions as the slug 65 hereinbefore described. In some instances it is preferable to provide the sections with two undercut recesses or slots, which construction is illustrated in Figs. 8 and 9. The jaw plate illustrated in Fig. 8 is provided with two undercut slots 66 which extend along the back of the jaw plate sections and receive the locking keys 67 therein. In the form illustrated in Fig. 9, the undercut slots 66' extend along the sides of the jaw plate sections and receive the locking keys therein, it being noted that in all instances the locking keys extend flush with the surfaces of the jaw plate sections.

In Figs. 10 to 14, each of the jaw plate sections are provided at their lower edges with the transversely extending lips 69, the extremities of which are enlarged so as to form the outstanding flanges 70. The inner wall 71 of each flange is undercut or beveled, while the outer or lower wall 72 extends substantially perpendicular to the back of the section. The remote edge of the section is provided with a groove or recess corresponding to the said lip and adapted to receive the same therein, the configuration of the recess or slot being such that an overhanging ledge 73 is provided, which is adapted to fit behind and engage the upstanding flange 70, to thus rigidly lock the adjacent sections in their assembled and jaw plate-forming relation. This form of jaw plate also includes an upper wedge block section 74, which unlike the remaining section, always occupies the same position and is discarded after becoming worn.

Inasmuch as the lower edge of the bottom section must present a smooth and continuous surface, the lip 69 is broken off prior to the placing of the section in the lowermost position. In order to facilitate this removal of the projecting lip, each section is provided with a transverse notch 75, extending completely across the back thereof, and at the innermost extremity of the lip, thus providing that the lip will break at the proper point for its complete removal. The various sections are provided with a keyway along their rear surfaces into which extends a locking key, similar to that described in connection with the jaw plate illustrated in Fig. 2. The angularity of the walls 71 and 72 of the upstanding flange, requires, that before the several sections may be assembled, they must be moved laterally in place. While certain advantages are connected with such structure, yet at times, it may involve a considerable amount of labor and time, and in order that the sections may be assembled or taken apart without the necessity of the lateral shifting of the sections, we form the front and rear walls of the lip flange so that they extend parallel, one to the other, and parallel to the upper and lower edges of the section. Such structures are illustrated in Fig. 16 wherein the lower wall 76 and upper wall 77 of the lip flange extend parallel, one to the other, and parallel to the upper and lower edges 78 of the section. This allows the various sections to be assembled, or taken apart by starting with the upper wedge block section 79 and assembling the various sections therebelow, after which the locking key 80 is forced into its seated position, holding the sections rigidly together and defining a unitary structure as well as an economical jaw plate.

The provision of a projecting lip at the lower extremity of each jaw plate section, while embodying certain advantages, at the same time necessitates the removal of the lip upon the assumption of the lowermost position by the jaw plate section, and in order to eliminate such waste, the lip may be formed upon the upper edge of the jaw plate section, such being illustrated in Fig. 15. The various sections, therein disclosed, are provided along their upper edges with the upwardly extending lips 81 which are adapted to fit in, and interlock with, correspondingly shaped recesses 82, formed along the lower edges of the adjacent sections. A wedge block section 83 is also included, forms the top of the jaw plate and is provided with a suitable recess adapted to receive and interlock with the upwardly projecting lip of the subadjacent section. As the various sections become worn and the lowermost is discarded, each section is moved downward a single space, and due to the fact that the lower edges of each of the sections are provided with recesses, the projecting lips will not in any way interfere with the seating of the jaw plate within the receiving recess formed in the swinging or stationary jaw, as the case may be.

Where a less positive engagement is sufficient between the various sections, the upper edges thereof are provided with the tongues 84, which are adapted to fit within the corresponding grooves 85 located at the lower edges of the sections. The tongues and grooves being substantially equal in thickness to the center locking key 86, provides that they will extend from the side edges of the section to the undercut key slot and not entirely across the section as was the case in the various forms illustrated in Figs. 10 to 16 inclusive.

The modification illustrated in Figs. 36 and 37 include relatively short lips and recesses which extend to equal sides of the longitudinal center of the sections, but it will be readily appreciated that all such changes clearly fall within the spirit of our invention.

A reinforcing back plate is disclosed in Figs. 19 to 23 and is so designed that it strengthens the various sections and at the same time positively locks the same against lateral shifting. The various sections 89 are provided along their side edges with the slots 90, the same being substantially V-shaped in cross-section and arranged with the one wall 91 thereof slanting rearward, so that the upturned edges 92 of the back plate 93 are adapted to engage the same and positively lock the various sections against lateral motion or shifting, and prevent the various sections from moving away from the back plate. As the various sections become worn, the lowermost is discarded and a new one substituted therefor, the new section being placed immediately below the upper wedge block section 94. A somewhat different form of back plate is illustrated in Fig. 22, wherein the sections 95 are provided with straight wall slots 96, into which the upstanding flanges 97 of the back plate are adapted to extend. In this form, the section may be removed from or inserted within a jaw without requiring the sections to be moved in a longitudinal direction. The various sections may be provided with undercut slots 98, such as illustrated in Fig. 23, which are adapted to receive the dovetail side flanges 99 of the back plate, such construction being similar to that disclosed in Fig. 21.

In place of the longitudinally extending locking keys disclosed in the early parts of the present specification, suitable bolts may be utilized, such as illustrated in Fig. 24, wherein each section is provided with the spaced longitudinally extending apertures 100, the lower extremities of each of which are enlarged as at 101, so that as each section occupies the lowermost position, the head 102 of the bolt 103 may seat therein. The uppermost wedge block section 103' is also provided with an enlarged apertured portion 104, allowing a nut 105, which engages the end of the bolt 103, to countersink therein. Thus the bolts may be drawn into rigid engagement with the various sections so as to clamp them in their jaw plate forming relation.

Similar holding means are employed in the jaw plate illustrated in Figs. 25 and 26, wherein the various sections are provided with spaced apertures 106, adapted to receive the bolts 107 therethrough. These bolts are provided with the T-shaped heads 108, and in order that they may seat flush within the various sections as they occupy the lowermost position, each section is provided with a slot 109 communicating with the lowermost extremity of each of the spaced apertures. The T-shaped ends of the bolts are adapted to countersink within the slots, while the upper extremities of the bolts project beyond the uppermost wedge block section 110, and are provided with apertures 111 extending therethrough, adapted to receive suitable holding pins or analogous means. It will be apparent from the foregoing, that regardless of the locking means employed whereby the several sections are held in their assembled relation, each of the sections may be moved downwardly so as to successively occupy all but the top positions of a jaw plate.

A somewhat modified form of centrally disposed locking key is illustrated in Figs. 33 to 35, wherein each of the sections 112 is provided with an undercut recess 113, extending along the back, and centrally disposed with respect to the side edges thereof. The lower extremities of each of these recesses are enlarged as at 114, in order to accommodate the head 115 with which the locking key 116 is provided. The enlarged portion 114 of these recesses allows the said key head to seat therein and thus not in any way interfere with the securing of the jaw plate within the receptacle provided therefor in the crusher jaw. The upper extremity of the headed locking key 116 is provided with an aperture 117 therein, allowing a hook to be used to engage the said jaw plate and facilitate its removal. As the lowermost section becomes worn beyond use, the locking key is withdrawn and the various sections moved down a single space and a new section inserted directly beneath the wedge block section 118.

In the forms of jaw plates hereinbefore described, the various sections forming each have been identical throughout, and interchangeable. A somewhat different construction is disclosed in Figs. 27 to 30 inclusive, wherein each jaw plate includes an upper section 119, a lower section 120 and an intermediate section 121, the latter being formed as a wedge block, as clearly illustrated in Fig. 28. This jaw plate therefore is formed with three sections and in order that the same may be securely locked in their assembled relation, the side edges of the upper and lower sections are provided with the longitudinally extending slots 122, which enlarge at their rear extremities as at 123. The intermediate section is provided with a straight slot 124, adapted to aline with the aforementioned slots, so that when the several sections are assembled, as disclosed in Fig. 28, a continuous and centrally disposed slot or recess will be defined with enlarged ends, into which a locking key 125 may be inserted, and thus prevent the disengagement of the various sections. The slots may partake of several different forms, those illustrated in Fig. 29 being provided with the rounded enlarged portions 126, while the slots disclosed in Fig. 30 are of uniform width throughout. Other forms of slots are illustrated in Figs. 31 and 32, the former being doubled so as to form a continuous slot 127 which is in the form of the letter O into which a similarly shaped key 128 is adapted to extend. In Fig. 32, the slots do not extend entirely across the intermediate section 121, but are U-shaped, into which the substantially U-shaped locking keys 129 are adapted to extend. Each of the sections are provided with slots upon both sides, so that the various sections will be rigidly locked together at two points.

In the practical use of jaw plates formed of upper, lower and intermediate sections, the lower section is used until it becomes excessively worn at its lower extremity. The section is then turned, bringing the remote edge into the lowermost position, so that it will be subjected to the greatest wear. After the lowermost section has thus completely worn out, it will be discarded and the upper section placed in a position so as to occupy that of the discarded section, and a new section is inserted and forms the uppermost section of the jaw plate. The intermediate section does not occupy more than one position, but is discarded as soon as it becomes worn beyond service and a new one is then substituted therefor.

The successive lowering of the various sections which go to make up a single jaw plate will thus tend to preserve a substantially constant spacing or width between the jaws of the crusher, for any given position, and thus render unnecessary any adjustment of the jaws to compensate for wear in order that the crushed rock or ore may at all times be crushed to a substantially uniform size.

Having thus fully described our invention, what we claim is:—

1. A crusher jaw plate comprising a plurality of transverse sections provided with alined openings therein extending longitudinally thereof.

2. A crusher jaw plate comprising a plurality of transverse sections provided with alined keyway openings extending longitudinally thereof, and a holding member positioned within said keyway opening and locking the several sections together.

3. A crusher jaw plate comprising a plurality of interchangeable transverse sections, said sections provided with alined openings extending longitudinally thereof, and means extending through said openings engaging the several sections and locking them against movement.

4. A crusher jaw plate comprising a plurality of interchangeable sections with the edges of each section beveled in corresponding directions, and a top section with oppositely inclined edges forming a wedge block, said sections provided with openings extending longitudinally thereof adapted to receive holding means therein for locking the several sections against movement.

5. A crusher jaw plate comprising a plurality of sections provided with longitudinally extending and alined openings, each of said sections provided with recesses communicating with the afore-mentioned openings, an elongated holding member fitting in the said openings, and means associated therewith engaging the recess of the lowermost section and holding the several sections and the holding member against movement.

6. A crusher jaw plate comprising a plurality of interchangeable transverse sections, said sections provided with alined longitudinally extending keyways with undercut side walls, and a key with beveled sides fitting within said keyways and holding the several sections against movement.

7. A crusher jaw plate comprising a plurality of transverse sections provided with longitudinally extending and alined openings, a headed holding member fitting within said alined openings, with the head thereof fitting within a recess with which each section is provided.

8. A crusher jaw plate comprising a plurality of transverse, similar and interchangeable sections, with the upper and lower walls thereof correspondingly beveled, a top block provided with the upper and lower walls thereof oppositely beveled, the lower wall of said top block beveled to correspond to the bevel of the top walls of said sections, said sections and top block provided with alined and longitudinally extending openings adapted to receive a holding member therein.

Signed at Chicago, in the county of Cook and State of Illinois, this 4th day of January, 1915.

WALTER S. McKEE.

Witnesses:
 S. M. MARTIN,
 M. B. MYERS.

Signed at Salt Lake, in the county of Salt Lake, and State of Utah, this 28th day of December, 1914.

FRANK E. JOHNSON.

Witnesses:
 ELLEN JOHNSON,
 O. F. DAVIS.